(12) United States Patent
Blasenheim et al.

(10) Patent No.: US 11,268,901 B2
(45) Date of Patent: Mar. 8, 2022

(54) VARIABLE APERTURE MASK

(71) Applicant: KLA Corporation, Milpitas, CA (US)

(72) Inventors: Barry Blasenheim, Campbell, CA (US); Noam Sapiens, Cupertino, CA (US); Michael Friedmann, Mountain View, CA (US); Pablo Rovira, Santa Clara, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 15/930,379

(22) Filed: May 12, 2020

(65) Prior Publication Data

US 2020/0271569 A1    Aug. 27, 2020

Related U.S. Application Data

(62) Division of application No. 16/056,244, filed on Aug. 6, 2018, now Pat. No. 10,663,392.

(60) Provisional application No. 62/543,315, filed on Aug. 9, 2017.

(51) Int. Cl.
| | |
|---|---|
| *G01N 21/21* | (2006.01) |
| *G01J 3/02* | (2006.01) |
| *G01J 4/00* | (2006.01) |
| *G02B 27/28* | (2006.01) |
| *G02B 27/30* | (2006.01) |

(52) U.S. Cl.
CPC .......... *G01N 21/211* (2013.01); *G01J 3/0229* (2013.01); *G01J 3/0237* (2013.01); *G01J 4/00* (2013.01); *G02B 27/28* (2013.01); *G02B 27/30* (2013.01); *G01N 2021/213* (2013.01)

(58) Field of Classification Search
CPC .......... G01J 3/0229; G01J 3/0237; G01J 4/00; G01N 2021/213; G01N 21/211; G02B 27/28; G02B 27/30
See application file for complete search history.

(56) References Cited

U.S. PATENT DOCUMENTS

| | | | |
|---|---|---|---|
| 5,608,526 A | | 3/1997 | Piwonka-Corle et al. |
| 5,751,420 A | * | 5/1998 | Iida .......................... G01J 3/02 356/328 |
| 5,859,424 A | | 1/1999 | Norton et al. |
| 6,429,943 B1 | | 8/2002 | Opsal et al. |
| | | (Continued) | |

FOREIGN PATENT DOCUMENTS

JP    2000121553 A    4/2000

OTHER PUBLICATIONS

PCT/US2018/045852, International Search Report, dated Nov. 26, 2018.

(Continued)

*Primary Examiner* — Hina F Ayub
(74) *Attorney, Agent, or Firm* — Huse IP Law; Charles C. Huse

(57) ABSTRACT

A collection system of a semiconductor metrology tool includes a chuck to support a target from which an optical beam is reflected and a spectrometer to receive the reflected optical beam. The collection system also includes a plurality of aperture masks arranged in a rotatable sequence about an axis parallel to an optical axis. Each aperture mask of the plurality of aperture masks is rotatable into and out of the reflected optical beam between the chuck and the spectrometer to selectively mask the reflected optical beam.

11 Claims, 5 Drawing Sheets

(56) References Cited

U.S. PATENT DOCUMENTS

| | | | |
|---|---|---|---|
| 7,158,231 B1* | 1/2007 | Woollam | G01J 3/02 |
| | | | 356/369 |
| 7,478,019 B2 | 1/2009 | Zangooie et al. | |
| 7,933,026 B2 | 4/2011 | Opsal et al. | |
| 9,915,522 B1 | 3/2018 | Jiang et al. | |
| 2006/0114470 A1 | 6/2006 | Takashima et al. | |
| 2008/0013086 A1 | 1/2008 | Deck | |
| 2008/0049220 A1 | 2/2008 | Izzia et al. | |
| 2008/0055592 A1 | 3/2008 | Nakamura et al. | |
| 2012/0086795 A1 | 4/2012 | Weiss et al. | |
| 2012/0257200 A1 | 10/2012 | Blasenheim et al. | |
| 2014/0172394 A1 | 6/2014 | Kuznetsov et al. | |
| 2014/0222380 A1 | 8/2014 | Kuznetsov et al. | |
| 2015/0204664 A1 | 7/2015 | Bringoltz et al. | |

OTHER PUBLICATIONS

PCT/US2018/045852, Written Opinion of the International Searching Authority, dated Nov. 26, 2018.

* cited by examiner

VARIABLE APERTURE MASK

RELATED APPLICATIONS

This application is a divisional application of U.S. patent application Ser. No. 16/056,244, filed Aug. 6, 2018, titled "Variable Aperture Mask" and claims priority to U.S. Provisional Patent Application No. 62/543,315, filed Aug. 9, 2017, titled "Variable AOI and Azimuth Mask," both of which are hereby incorporated by reference in their entirety for all purposes.

TECHNICAL FIELD

This disclosure relates to optical semiconductor metrology (e.g., ellipsometry), and more specifically to using an aperture mask that provides a variable aperture.

BACKGROUND

Optical metrology tools such as ellipsometers are used to characterize targets, such as semiconductor wafers, by reflecting an optical beam off of the target. Performing accurate characterization using such tools, however, presents significant challenges. For example, characterization results are affected by multiple parameters of the target. Some target parameters may be correlated such that variation of different parameters has the same effect. Correlations between target parameters make it difficult to know which parameter is responsible for a particular result. To break these correlations and accurately characterize the target based on the optical-metrology results, it is desirable to vary the manner in which the optical beam reflects off of the target.

FIG. 1 is a schematic illustration of a prior-art ellipsometer 100 for characterizing a target 120 (e.g., a semiconductor wafer). In the ellipsometer 100, an illumination system 102 provides an optical beam from a laser-driven light source (LDLS) 106 to the target 120, which reflects the optical beam. A collection system 104 provides the reflected optical beam to a spectrometer 132. The illumination system 102 includes, in sequence, a plurality of mirrors 108-1 through 108-4, a Rochon polarizer 110, an aperture 112, an apodizer 114, a convex mirror 116, and a concave mirror 118. The collection system 104 includes, in sequence, a collection mask 122 on a concave mirror 124, a convex mirror 126, a retarder 128, and an analyzer 130 (e.g., a polarizer).

The collection mask 122 includes three shuttered apertures at fixed angles of incidence with respect to the target 120 (as measured from an axis perpendicular to the surface of the target 120): 59°, 65°, and 71°. By opening one of the shutters, the collection mask 122 allows a portion of the optical beam at a specified angle of incidence to be reflected by the concave mirror 124 to the convex mirror 126, and thus to proceed toward the spectrometer 132. In this manner, the collection mask 122 masks the optical beam reflected from the target 120. The ellipsometer 100 thus allows measurements to be taken at three different angles of incidence, which is useful for breaking correlation to achieve accurate characterization of the target 120.

The collection mask is very sensitive to misalignment, however: it is situated at a position where the optical beam diverges by over 10°. And because the three apertures on the collection mask 122 are fixed, the user cannot vary any of the apertures. For example, the user cannot select other angles of incidence, cannot vary the range of angles of incidence for a given aperture (e.g., to increase beam brightness), and cannot rotate the apertures to accommodate variation in the angle of azimuth of the target 120 with respect to the optical beam.

SUMMARY

Accordingly, there is a need for methods and systems of varying an aperture used to mask an optical beam in a semiconductor metrology tool.

In some embodiments, an aperture mask for use in a semiconductor metrology tool includes a frame and a plurality of opaque plates mechanically coupled to the frame. The frame has a hole to allow transmission of an optical beam. The opaque plates have adjustable positions with respect to the hole, to block respective portions of the hole and corresponding parts of the optical beam.

In some embodiments, a collection system of a semiconductor metrology tool includes a chuck to support a target from which an optical beam is reflected and an aperture mask to provide an adjustable aperture for the reflected optical beam. The aperture mask includes a plurality of opaque plates with adjustable positions. The collection system also includes a spectrometer to receive the reflected optical beam. The aperture mask is situated between the chuck and the spectrometer along the optical axis.

In some embodiments, a method of operating a semiconductor metrology tool includes loading a target on a chuck and illuminating the target with an optical beam, such that the target reflects the optical beam. Positions of one or more opaque plates on an aperture mask that masks the reflected optical beam are adjusted, to achieve at least one of: (i) a selected central angle of incidence for the optical beam with respect to the target, (ii) a selected range of angles of incidence for the optical beam with respect to the target, or (iii) a selected degree of rotation of the one or more opaque plates that corresponds to an angle of azimuth of the target with respect to the optical beam.

In some embodiments, a collection system of a semiconductor metrology tool includes a chuck to support a target from which an optical beam is reflected and a spectrometer to receive the reflected optical beam. The collection system also includes a plurality of aperture masks arranged in a rotatable sequence about an axis parallel to an optical axis. Each aperture mask of the plurality of aperture masks is rotatable into and out of the reflected optical beam between the chuck and the spectrometer to selectively mask the reflected optical beam.

BRIEF DESCRIPTION OF THE DRAWINGS

For a better understanding of the various described implementations, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
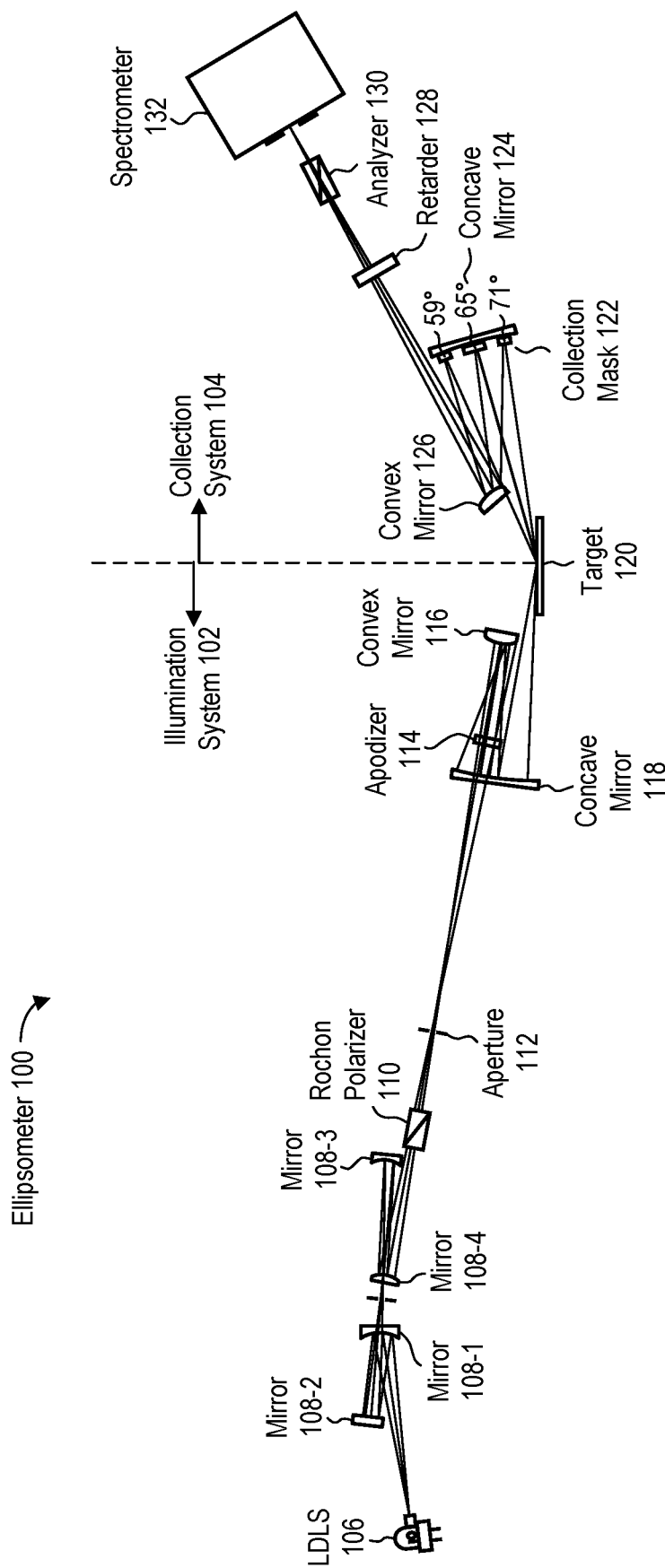
FIG. 1 is a schematic illustration of a prior-art ellipsometer for characterizing a target, such as a semiconductor wafer.
Figure 2:
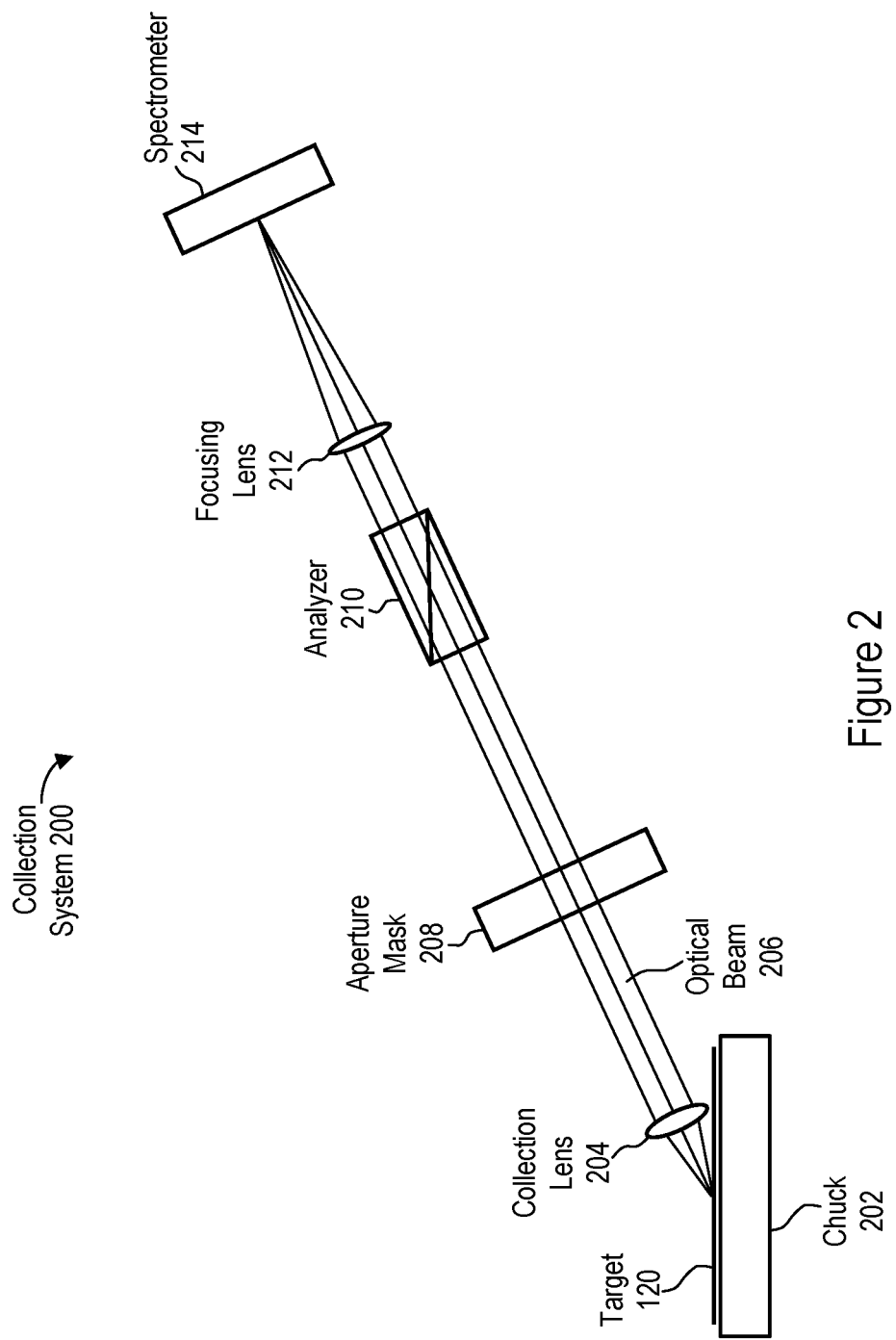
FIG. 2 is a schematic illustration of a collection system with an aperture mask that provides an adjustable aperture in accordance with some embodiments.

FIG. 2 is a schematic illustration of a collection system 200 with an aperture mask 208 that provides an adjustable aperture in accordance with some embodiments. The collection system 200 may replace the collection system 104 in the ellipsometer 100 (FIG. 1) or may be used in a different semiconductor metrology tool (e.g., a different ellipsometer). In some embodiments, the aperture mask 208 is adjustable to achieve at least one of (e.g., all of): (i) a selected central angle of incidence for the optical beam with respect to the target, (ii) a selected range of angles of incidence for the optical beam with respect to the target, or (iii) a selected degree of rotation of the one or more opaque plates that corresponds to an angle of azimuth of the target with respect to the optical beam.

In the collection system 200, a target 120 (e.g., a semiconductor wafer) is mounted on a chuck 202. An optical beam 206 is reflected off of the target 120. (The incident optical beam, as provided by an illumination system, is not shown in FIG. 1 for visual clarity.) The chuck 202 may be rotatable to vary an angle of azimuth of the target 120 with respect to the optical beam 206. A collection lens 204 collimates the optical beam 206, such that the optical beam 206 is substantially collimated (e.g., to within tolerances for the collection lens 204) between the collection lens 204 and a focusing lens 212. The aperture mask 208 thus is in collimated space. The aperture mask 208 masks the collimated optical beam 206 by allowing transmission of part of the optical beam 206 and blocking transmission of other parts of the optical beam 206. (The masked optical beam 206 is still referred to as the optical beam 206, even though parts of it have been blocked.) An analyzer 210 (e.g., a polarizer) adjusts the optical beam 206 (e.g., changes its polarization), and the focusing lens 212 focuses the optical beam 206 onto a spectrometer 214, which measures the optical beam 206 (e.g., measures its intensity across wavelengths). In some embodiments, the optical beam 206 as reflected off the target 120 has elliptical polarization, and the analyzer 210 adjusts the polarization of the optical beam 206 to be linear.

In some embodiments, the collection lens 204 is omitted, such that the optical beam 206 is not collimated at the aperture mask 208 (i.e., the aperture mask 208 is not in collimated space). The collection lens 204 may be omitted, for example, when the range of angles of incidence in the optical beam 206 is less than (or less than or equal to) 15° or 10°.

In some embodiments, the collection system 200 includes one or more additional components. For example, the collection system 200 may include a compensator between the aperture mask 208 and the analyzer 210.

Figure 3:
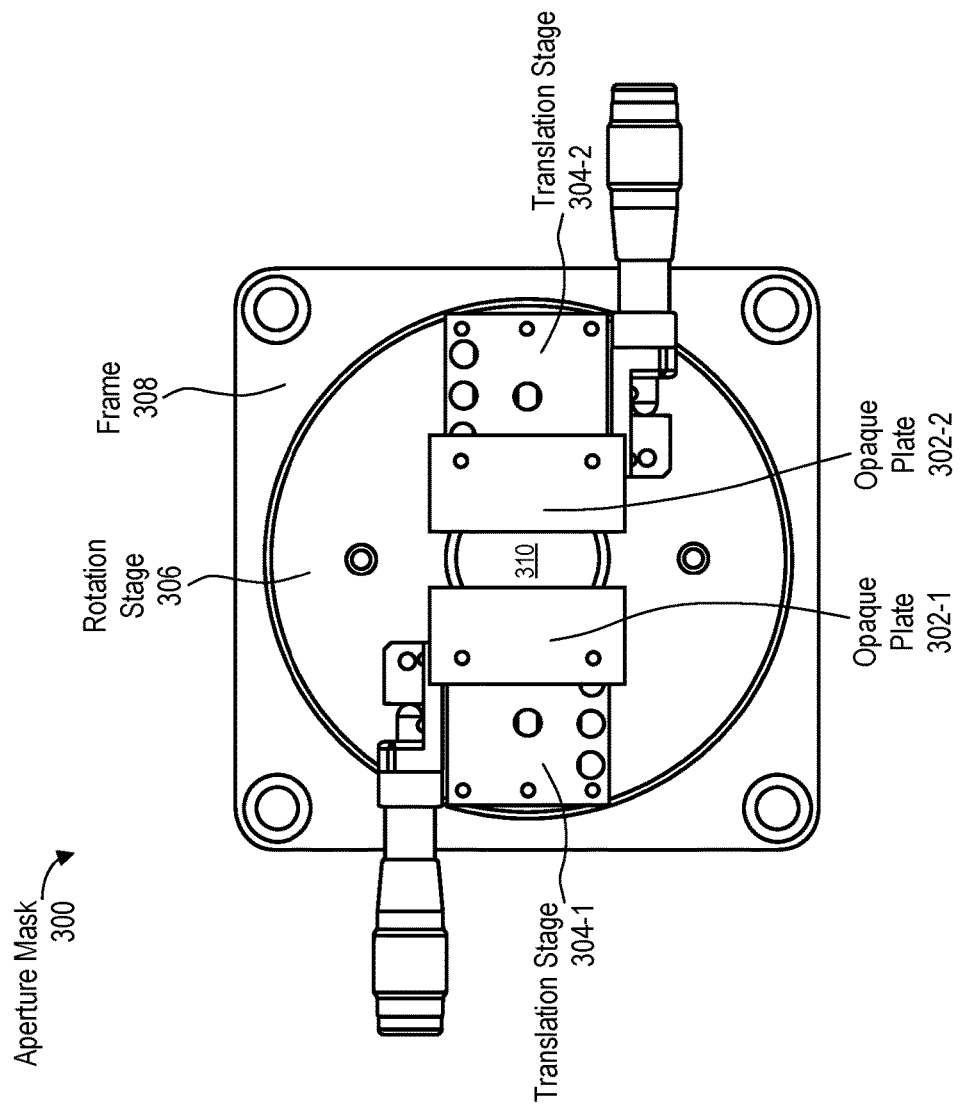
FIG. 3 shows a plan view of an example of the aperture mask of FIG. 2 in accordance with some embodiments.

FIG. 3 shows a plan view of an aperture mask 300 that is an example of the aperture mask 208 (FIG. 2) in accordance with some embodiments. The aperture mask 300 includes a rotation stage 306 that is mounted on a frame 308 and is rotatable with respect to the frame 308, about an axis through a hole 310 (e.g., the optical axis or an axis parallel to the optical axis). The rotation stage 306 and frame 308 have respective holes (e.g., in their respective middles) such that, when the rotation stage 306 is mounted on the frame 308, the hole 310 (e.g., in the middle of aperture mask 300) results. The hole 310 allows transmission of part of the optical beam 206 through the aperture mask 300. Two translation stages 304-1 and 304-2 are mechanically coupled, directly or indirectly, to the rotation stage 306 (e.g., are mounted on the rotation stage 306), such that the translation stages 304-1 and 304-2 rotate in accordance with rotation of the rotation stage 306. The translation stages 304-1 and 304-2 are thus mechanically coupled to the frame 308 by the rotation stage 306 and are rotatable about the axis through the hole 310.

Respective opaque plates 302 are mounted on respective translations stages 304: a first opaque plate 302-1 is mounted on the first translation stage 304-1 and a second opaque plate 302-2 is mounted on the second translation stage 304-2. The opaque plates 302 are thus mechanically coupled to the rotation stage 306 through respective translation stages 304, and to the frame 308 through respective translation stages 304 and the rotation stage 306. The positions of the opaque plates 302 are adjustable, using the translation stages 304 and rotation stage 306, to block respective portions of the hole 310 and corresponding portions of the optical beam 206. The portion of the hole 310 that is not blocked by the opaque plates 302 is an aperture for the optical beam 206. The opaque plates 302 thus serve as respective aperture edges.

The first and second translation stages 304-1 and 304-2 are used to adjust respective linear positions of the first and second opaque plates 302-1 and 302-2. In some embodiments, the first and second translation stages 304-1 and 304-2 are independently operable to adjust the linear positions of the first and second opaque plates 302-1 and 302-2. The distance between the first and second opaque plates 302-1 and 302-2 may thus be widened or narrowed, to widen or narrow the unblocked portion of the hole 310 (i.e., the width of the aperture). This widening or narrowing adjusts the range of angles of incidence for the optical beam 206, with respect to the target 120, that is transmitted through the aperture. Widening the aperture increases the transmitted range of angles of incidence, while narrowing the aperture reduces the range of angles of incidence. Allowing a wide range of angles of incidence through the aperture mask 300 may be desirable to obtain a strong signal (e.g., when the relevant portion of the optical beam 206 has a low intensity). Allowing a narrow range of angles of incidence through the aperture mask 300 may be desirable when a target parameter produces an effect that is a strong function of the angle of incidence.

In some embodiments, the first and second translation stages 304-1 and 304-2 are substantially aligned along a common axis (e.g., a diameter of the rotation stage 306) and allow independent adjustment of the linear positions of the first and second opaque plates 302-1 and 302-2 along the common axis. In some embodiments, the first and second translation stages 304-1 and 304-2 are motorized (e.g., each has its own motor, such as a stepper motor).

In some embodiments, the rotation stage 306 rotates in accordance with (e.g., by a radial amount equal to) rotation of the chuck 202, to accommodate a change in the angle of azimuth of the target 120 with respect to the optical beam 202. In some embodiments, the rotation stage 306 is motorized.

In the example of FIG. 3, the aperture mask 300 has two opaque plates 302. In other examples, an aperture mask may have three or more opaque plates, each of which may be mounted on a respective translation stage, with the translation stages being mounted on a single rotation stage. The translation stages may each be independently operable to adjust respective positions of the plurality of opaque plates.

In some embodiments, the rotation stage 306 is omitted. For example, the translation stages 304 may be directly mounted on the frame 308. In other embodiments, one or more (e.g., all) of the translation stages 304 are omitted. For example, one or more corresponding opaque plates 302 (e.g., all of the opaque plates 302) may be fixedly mounted on the rotation stage 306, such that they partially overlap the hole 310.

The aperture mask 300 thus provides a single adjustable aperture, as opposed to the multiple fixed apertures provided by the collection mask 122 (FIG. 1). The aperture provided by the aperture mask 300 can be widened, narrowed, shifted, and/or rotated. The ease with which the aperture can be adjusted makes the aperture mask 300 insensitive to misalignment. While the aperture mask 300 has been described as being used in the collection system 200 (FIG. 2) of a metrology tool, it may alternatively or additionally be used in the illumination system of a metrology tool.

Figure 4:
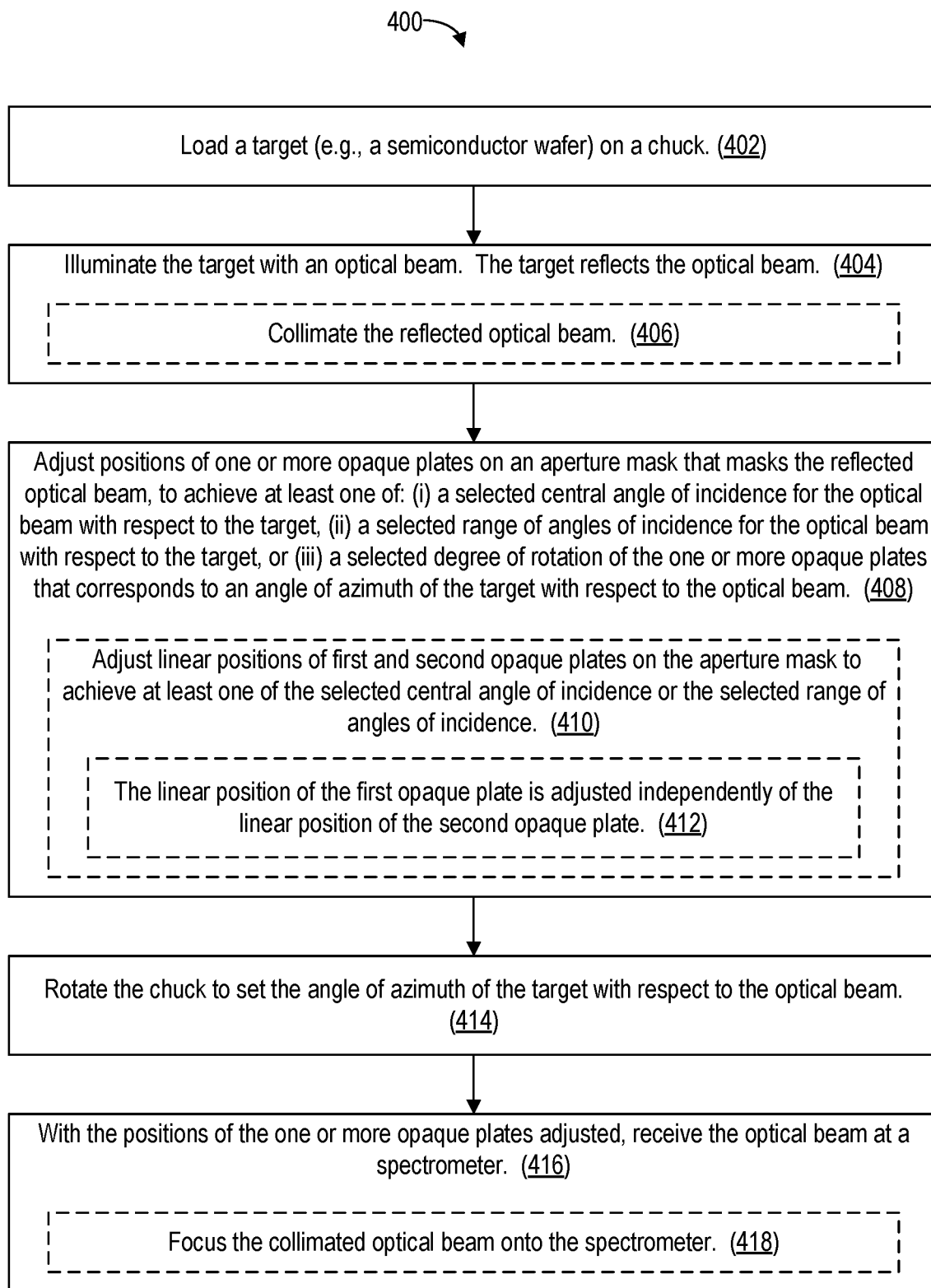
FIG. 4 is a flowchart illustrating a method of operating a semiconductor metrology tool such as an ellipsometer, in accordance with some embodiments.

FIG. 4 is a flowchart illustrating a method 400 of operating a semiconductor metrology tool (e.g., an ellipsometer) in accordance with some embodiments. The metrology tool may include the collection system 200 (FIG. 2), which may include the aperture mask 300 (FIG. 3).

In the method 400, a target (e.g., target 120, FIG. 2) is loaded (402) on a chuck (e.g., chuck 202, FIG. 2). The target is illuminated (404) with an optical beam and reflects the optical beam. In some embodiments, the reflected optical beam (e.g., optical beam 206) is collimated (406), such that an aperture mask (e.g., aperture mask 208, FIG. 2; aperture mask 300, FIG. 3) masks the collimated beam.

Positions of one or more opaque plates (e.g., optical plates 302-1 and 302-2, FIG. 3) are adjusted (408) on the aperture mask that masks the reflected optical beam, to achieve at least one of: (i) a selected central angle of incidence for the optical beam with respect to the target, (ii) a selected range of angles of incidence for the optical beam with respect to the target, or (iii) a selected degree of rotation of the one or more opaque plates that corresponds to an angle of azimuth of the target with respect to the optical beam. In some embodiments, linear positions of first and second opaque plates on the aperture mask are adjusted (410) to achieve at least one of the selected central angle of incidence or the selected range of angles of incidence. The linear position of the first opaque plate may be adjusted independently (412) of the linear position of the second opaque plate. For example, the linear positions of the opaque plates 302-1 and 302-2 are independently adjusted using the translation stages 304-1 and 304-2 (FIG. 3).

In some embodiments in which the positions are adjusted to achieve the selected degree of rotation (i.e., the positions are rotated by the selected degree of rotation, for example using the rotation stage 306, FIG. 3), the chuck is rotated (414) to set the angle of azimuth of the target with respect to the optical beam.

With the positions of the one or more opaque plates adjusted, the optical beam is received (416) at a spectrometer (e.g., spectrometer 214, FIG. 2). For example, the collimated optical beam is focused (418) onto the spectrometer.

Steps in the method 400 that are not order-dependent may be reordered and steps may be combined or broken out. For example, steps 408-414 may be performed before steps 404 and 406. Also, step 414 may be performed before or at the same time as step 408, which may or may not include steps 410 and 412. Furthermore, one or more steps (e.g., step 414 or steps 410 and 412) may be omitted.

Figure 5:
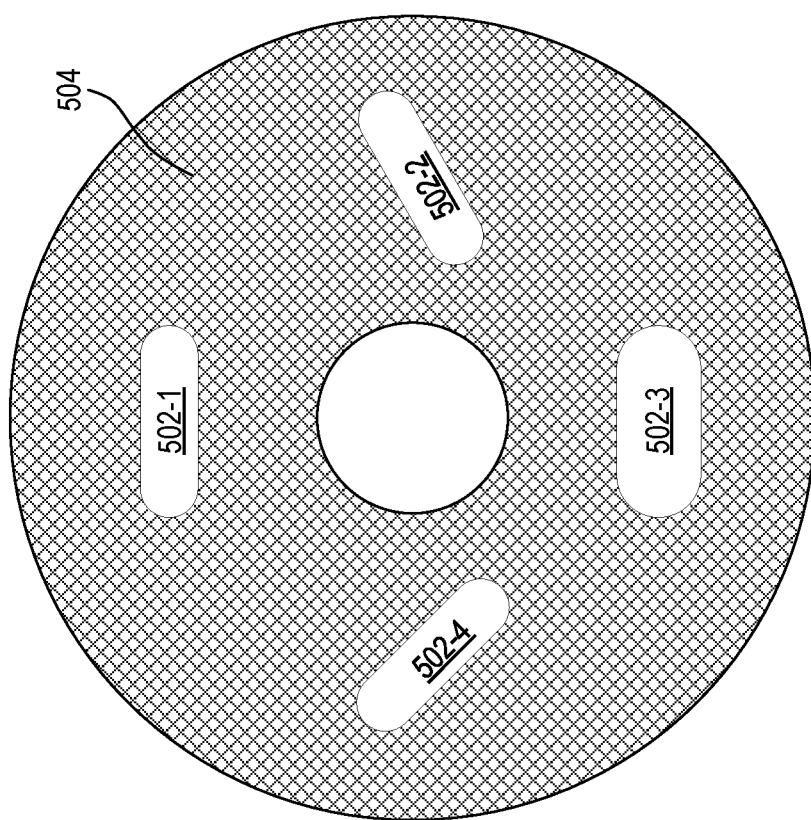
FIG. 5 shows an arrangement of differing apertures in a rotatable structure in accordance with some embodiments.

In some embodiments, instead of adjusting a single aperture mask to vary an aperture, different apertures may be selectively moved into and out of the optical beam (e.g., optical beam 206, FIG. 2). FIG. 5 shows an arrangement of differing apertures 502-1, 502-2, 502-3, and 502-4 in a rotatable structure 504 (e.g., a turret), in accordance with some embodiments. The differing apertures 502 may vary in size and/or orientation and may be rotated into and out of the optical beam to selectively mask the optical beam. The structure 504 rotates about an axis parallel to the optical axis, and thus provides a plurality of aperture masks arranged in a rotatable sequence. In some embodiments, the structure 504 replaces the aperture mask 208 in the collection system 200 (FIG. 4). In other embodiments, different apertures may be situated in respective plates that may be placed (e.g., slid) into or removed from the path of the optical beam, thus allowing respective apertures to be selectively moved into or out of the optical beam.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A collection system of a semiconductor metrology tool, comprising:
   a chuck to support a target from which an optical beam is reflected;
   a spectrometer to receive the reflected optical beam;
   a plurality of aperture masks arranged in a rotatable sequence about an axis parallel to an optical axis, wherein each aperture mask of the plurality of aperture masks is rotatable into and out of the reflected optical beam between the chuck and the spectrometer to selectively mask the reflected optical beam;
   a collection lens, situated between the chuck and the plurality of aperture masks along the optical axis, to collimate the reflected optical beam, wherein the reflected optical beam is substantially collimated at a respective aperture mask of the plurality of aperture masks when the respective aperture mask is in the reflected optical beam; and
   a focusing lens, situated between the plurality of aperture masks and the spectrometer along the optical axis, to focus the collimated optical beam, as masked by the respective aperture mask, onto the spectrometer.

2. The collection system of claim 1, further comprising a turret on which the plurality of aperture masks is mounted.

3. The collection system of claim 1, wherein the plurality of aperture masks varies in size.

4. The collection system of claim 1, wherein the plurality of aperture masks varies in orientation.

5. The collection system of claim 1, wherein the plurality of aperture masks varies in size and orientation.

6. The collection system of claim 1, further comprising an analyzer, situated between the plurality of aperture masks and the focusing lens along the optical axis, to change the polarization of the reflected optical beam.

7. A method of operating a semiconductor metrology tool, comprising:
- loading a target on a chuck;
- illuminating the target with an optical beam, wherein the target reflects the optical beam;
- collimating the reflected optical beam;
- selectively masking the collimated optical beam, comprising rotating a respective aperture mask of a plurality of aperture masks into the collimated optical beam, wherein the plurality of aperture masks is arranged in a rotatable sequence about an axis parallel to an optical axis;
- focusing the collimated and masked optical beam onto a spectrometer; and
- receiving the focused optical beam, as masked by the respective aperture mask, at the spectrometer.

8. The method of claim 7, wherein the rotating comprises rotating a turret on which the plurality of aperture masks is mounted.

9. The method of claim 7, wherein the plurality of aperture masks varies in size.

10. The method of claim 7, wherein the plurality of aperture masks varies in orientation.

11. The method of claim 7, wherein the plurality of aperture masks varies in size and orientation.

* * * * *